June 12, 1923.
I. S. ERMAN
ICE CREAM DISPENSING DEVICE
Filed Feb. 28, 1919
1,458,224
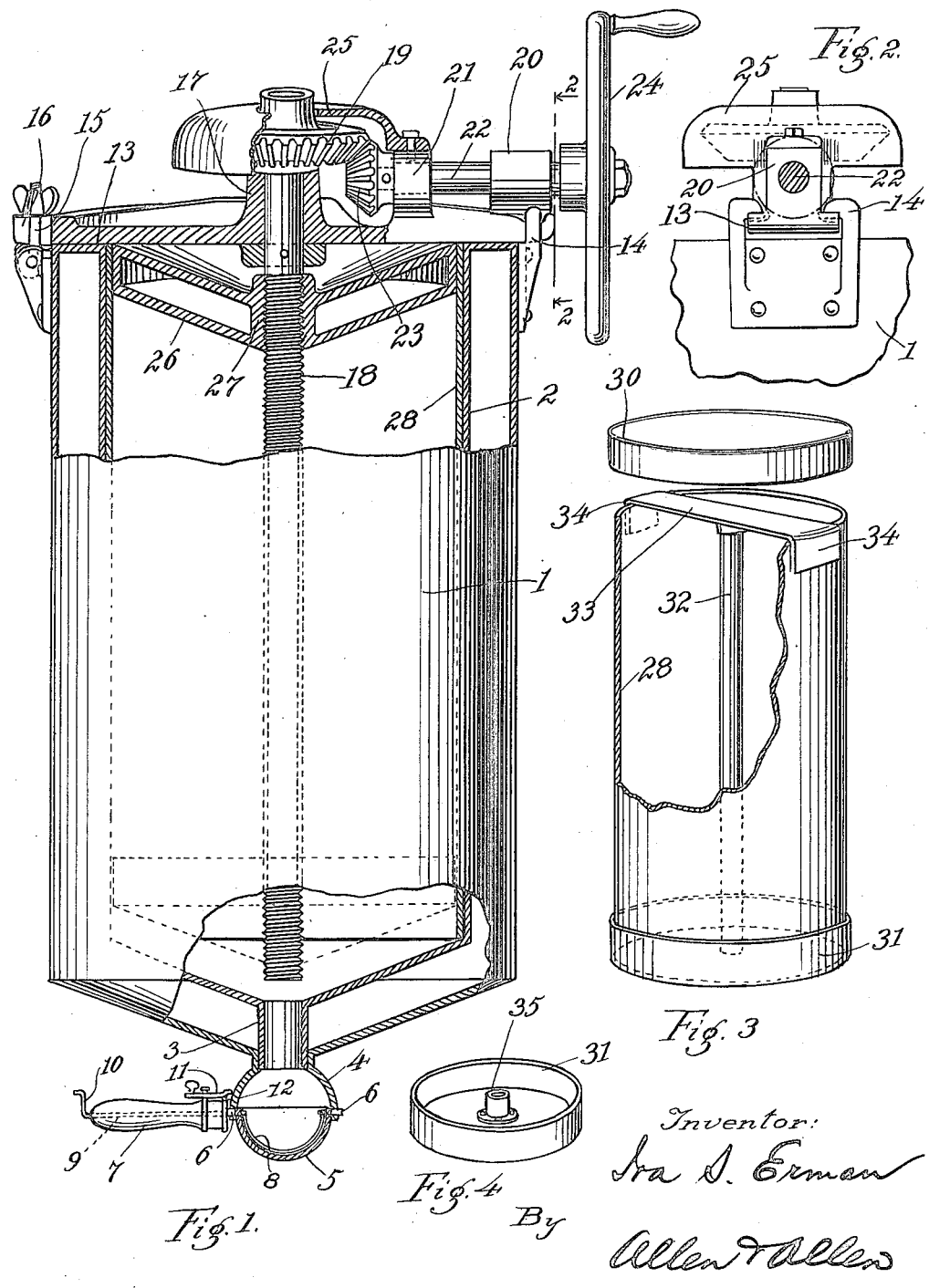

Patented June 12, 1923.

1,458,224

UNITED STATES PATENT OFFICE.

IRA STRAUSS ERMAN, OF CINCINNATI, OHIO.

ICE-CREAM-DISPENSING DEVICE.

Application filed February 28, 1919. Serial No. 279,756.

*To all whom it may concern:*

Be it known that I, IRA S. ERMAN, a citizen of the United States, and a resident of Cincinnati, in the county of Hamilton and State of Ohio, have invented certain new and useful Improvements in Ice-Cream-Dispensing Devices, of which the following is a full, clear, and exact description, reference being had to the accompanying drawing, forming part of this specification.

My invention relates to devices for dispensing ice cream. According to the usual practice, ice cream is manufactured in the factory and delivered to the dispenser, druggist, confectioner, or the like, in cans packed with ice in large buckets, the whole package being called a "freezer." At the factory, the cream is first frozen to the consistency of a fluid paste and is poured into the metal cans in this condition. The cans are then placed in a refrigerating room where the freezing is completed in the cans, the cream becoming solidly frozen. For delivery, these cans provided with a suitable lid or cover, are packed with ice and salt into the buckets as above noted. The dealer may use the freezer in the shape in which it is delivered, or he may provide himself with an ice box having compartments for the ice cream cans and place the cans which he receives in the compartments of his ice box.

From the time of its delivery until it has been served, the ice cream must be kept in condition with ice and salt, with its attendant chances of contaminating the cream, its demand for constant attention and its tendency to spread salty water over the premises. Not only this, but the serving of the cream demands the constant lifting off and replacing of the lid of the can, or whatever lid is used in its place. Also the supply of buckets and cans which this trade enforces on the manufacturer must be very large. He must provide the freezer in use at the dealer's, a reserve freezer at the dealer's and one at the factory in order to supply the dealer with one freezer of cream per day. He must also provide for the cleaning of the cans, and the transportation of the ice-filled freezers as well as the packing of them.

My invention provides for the use of vacuum containers for ice cream, thereby doing away with the use of ice in connection with ice cream by dealers, and provides also a dispensing device for the cream, which does away with the constant lifting off of the lid of the ice cream can, and which also prevents access of air to the cream when dispensing it.

In my drawings I have not shown, nor do I describe in my specification any particular form of vacuum holder for the ice cream containers, aside from my dispensing device, and it will be understood that any form of box having a vacuum surrounded receptacle for the receiving of the ice cream containers will answer for means of transportation, and means of storage of the ice cream on the premises of the dealer.

I accomplish the above set forth objects of my invention and other advantages to be noted by that certain construction and arrangement of parts to be hereinafter more specifically pointed out and claimed.

In the drawing,

Figure 1 is a central longitudinal section of my device, partly in elevation.

Figure 2 is a detail side elevation of the operating member affixed to the top of the vacuum dispensing receptacle, taken on the line 2, 2, of Figure 1.

Figure 3 is a perspective view of the ice cream container, showing one form of device for providing the longitudinal hole through the block of ice cream.

Figure 4 is a perspective view of a lid for the ice cream container, showing another form of device for centering the "core" used to mold a central passageway through the ice cream block.

Before describing in detail the construction of my dispensing device, I wish to state that the particular mode of operation described is merely my preferred form, and shown mainly for the purpose of illustrating a follower working through the ice cream can, with the result of pressing a quantity of cream into a measuring and dispensing device, which latter device prevents the access of air to the cream during the dispensing.

Describing, then, the dispensing device, the vacuum vessel 1 having the inner wall 2 is formed at the base with a passageway 3 that passes through the inner and outer shells at the bases thereof. The air is exhausted between the two shells to prevent conduction of heat. At the mouth of the passageway is formed a hollow semispherical shell 4. Pivoted on the shell 4 is the cup 5, of like shape, but smaller in diameter, the mounting being accomplished by means of lugs 6, which extend from the sides of the cup, through holes pierced in the shell. A handle 7 is secured to one of the lugs and serves to revolve the cup, bringing it inside the shell, mouth down, so as to effectually remove and drop out any material within the shell. If desired, a scraper 8 may be mounted in the cup, same to be operated by a pin 9 extending through the handle of the cup and having a hand-hold 10 at the outer end.

It can be observed that were ice cream forced down from the inner shell of the vacuum vessel, through the passageway and into the shell and cup, that the turning of the cup would deliver a fixed quantity of ice cream for each operation.

A latch lever 11 may be provided, pivoted to the handle of the cup, and engaging over a lug 12 on the shell 4. The shell and cup form a measuring and delivering device for the vacuum vessel and furthermore the operation of the device does not admit air to contact with the interior of the vacuum vessel, at any time.

The method of forcing ice cream to the delivery device shown for illustration and as a preferred form herein, comprises a cross head, a screw extending through the cream, a follower having a vacuum shell, and a device for operating the screw mounted on the cross head.

The cross head 13 is held to the top of the vacuum vessel at one end by a clip 14 (Figure 2), and at the other end by a wing bolt 15 pivoted to the side of the vessel, and engaging in a slot 16 in the cross head. The cross head provides a journal 17 for the unthreaded upper end of the screw 18. It is this screw 18 which operates the follower.

On the upper end of the screw is mounted a beveled gear 19 and in journals 20, 21, on the cross head is carried the shaft 22 whose pinion 23 meshes with the said beveled gear. An operating wheel 24 or the like is secured on the shaft 22 and thus serves to revolve the beveled gear 19 and through it the follower advancing screw. A protective hood 25 mounted on the journal 20 of the cross head protects the gears from dirt and dust.

The follower 26 is formed with a double walled vacuum shell, and centrally is provided with a threaded orifice 27 to receive the screw 18. The follower has a conical shape on its under side, to correspond with the like conical shape of the base of the vacuum vessel and thus when pressed down to the base of the vessel will force out all of the cream therein.

The ice cream container 28 is of cylindrical shape, open top and bottom and fits snugly within the inner shell of the vacuum vessel. The follower is of a size to fit snugly in the ice cream container, and the friction of the follower against the sides of the container and against the ice cream therein, will prevent it from revolving with the screw, and will effectually hold it in one position within the ice cream container, so that the revolution of the screw will force it down through the device.

In use, an ice cream can filled with ice cream, said cream having a central passageway, is set in the vacuum vessel, with upper and lower lids removed, leaving a simple cylinder. The cross head and operating devices are set in place, the screw dropped through the passageway of the ice cream and the follower placed in the upper end of the container. The ice cream will then be protected from contact with the air by a vacuum except, of course, at the outlet, which will be sealed with ice cream. The gearing will be adjusted so that a given amount of turn to the handle will advance the follower just enough to fill the shell and cup with ice cream. The operator will therefore first turn the crank, say, one turn, and then give a turn to the cup at the base of the device, which will deliver a given sized portion of ice cream for the customer. By reason of having the follower advancing means in the shape of a screw positioned inside of the vessel, all unsightly and dirt collecting mechanism projecting above the vessel is done away with, and the device becomes one which will not be out of place in high class stores. It is presumed that the largest size used will be five or ten gallon containers, so that the operating handle and the delivery cup will both be within easy reach of the person serving the cream. I have not shown, nor will I describe such devices since I merely show the hand operation as descriptive of one method of accomplishing my invention, and it is understood that other driving mechanism can be substituted, if desired.

The manner in which the central passageway is made in the ice cream is as follows: The manufacturer, when he pours the ice cream in a thin paste into the ice cream container, will insert in the container a core, which core will remain in the cream in the refrigerating room. The ice cream cans have two lids, which, as shown at 30 and 31 (Figure 3), are mere covers for the ends of the container. In this form of container, the manufacturer will be provided with cores formed of rods 32 of wood or metal secured to plates 33. The plates are turned down at the ends at 34 so as to form cross heads that will fit over the ice cream containers, so as to center the cores therein. The cores are placed in the cream when it is soft, and after the cream has frozen solid in the refrigerating room will be removed, leaving the central passageway through the cream.

In another form, one of the lids will be provided with a socket piece 35 at its center (Figure 4), and the manufacturer will center his core piece in the cream by inserting it in the socket, the socket being deep enough to hold the core upright in the center of the container.

It is intended according to my invention, that the ice cream containers be made of waxed paper or other expendable material which will be used once only. The lids for the containers will be of paper also and will also be expended with one use. Should the core method of producing the cream be employed, with the core as shown in Figure 3, then nothing further will be needed but a supply of the core pieces at the manufacturer's. Should the metal socket method be employed, then a supply of the metal lids with sockets will be provided for the manufacturer. In neither case is it designed that the core pieces be delivered to the dealer, although this may be done if desired. All lids are removed when the container is in use, and but one lid (the bottom) is used during refrigeration.

To avoid all use of ice it will be necessary for the dealer to provide himself with a vacuum receptacle for spare ice cream containers, and for the manufacturer to provide himself with a like vacuum receptacle for keeping the ice cream solid during transportation. When this is done, there will be the entire doing away with the use of ice, as the vacuum vessels or holders will keep the cream in condition for many hours.

Having thus described my invention, what I claim as new and desire to secure by Letters Patent, is:—

1. A dispensing device for use with ice cream comprising a container, a vacuum shell vessel, a member mounted in the vessel adapted to advance through the container, and a delivery element on the vessel, said advancing member likewise having a vacuum shell.

2. The combination with a vacuum shell vessel, and means for forcing ice cream therefrom, of a delivery device to receive said cream comprising an inverted hemispherical shell at the outlet of the vessel, and a hemispherical cup of smaller diameter than the shell, and mounted revolubly in said shell whereby said cup in normal position closes the open end of the shell and by revolution will abstract the contents therefrom in the form of a sphere.

3. A dispensing device for ice cream comprising a vessel having a vacuum shell, a delivery passageway at one end thereof and open at the other, a follower in the vessel, a cross head secured to the vessel, and an operating device mounted on said cross head, said operating device adapted to advance the follower through the vessel toward the delivery passageway, said follower having likewise a vacuum shell.

4. A method of handling ice cream which consists in freezing the ice cream in a container with an axial hole formed in the ice cream mass, placing the container in a vacuum shell vessel, causing a follower to pass through the container when it is within the vessel, and utilizing the hole in the ice cream mass for clearance of a nonreciprocating element upon which the follower moves.

IRA STRAUSS ERMAN.